United States Patent
Schwartz et al.

(10) Patent No.: US 8,042,357 B2
(45) Date of Patent: Oct. 25, 2011

(54) HYDROGEN LIQUEFACTION METHOD AND LIQUEFIER

(75) Inventors: Joseph Michael Schwartz, Williamsville, NY (US); Raymond Francis Drnevich, Clarence Center, NY (US); Philip Alexander Barrett, Tonawanda, NY (US); Bernard Thomas Neu, Lancaster, NY (US)

(73) Assignee: Praxair Technology, Inc., Danbury, CT (US)

( * ) Notice: Subject to any disclaimer, the term of this patent is extended or adjusted under 35 U.S.C. 154(b) by 384 days.

(21) Appl. No.: 12/428,643

(22) Filed: Apr. 23, 2009

(65) Prior Publication Data

US 2010/0272634 A1 Oct. 28, 2010

(51) Int. Cl.
*F25J 1/02* (2006.01)
(52) U.S. Cl. .......................................... 62/607; 423/649
(58) Field of Classification Search ............. 62/607; 423/649
See application file for complete search history.

(56) References Cited

U.S. PATENT DOCUMENTS

| | | | | |
|---|---|---|---|---|
| 2,937,076 A | * | 5/1960 | Class et al. | 423/649 |
| 2,943,917 A | * | 7/1960 | Weitzel et al. | 423/649 |
| 3,092,461 A | * | 6/1963 | Vander Arend et al. | 423/649 |
| 3,095,274 A | | 6/1963 | Crawford | |
| 3,116,115 A | * | 12/1963 | Kasparian et al. | 423/649 |
| 3,180,709 A | * | 4/1965 | Roberts, Jr. et al. | 423/649 |
| 3,375,076 A | * | 3/1968 | Vander Arend | 423/649 |
| 3,380,809 A | | 4/1968 | Newton | |
| 3,383,176 A | * | 5/1968 | Keith et al. | 423/649 |
| 3,992,167 A | * | 11/1976 | Beddome | 62/639 |
| 4,205,056 A | * | 5/1980 | Inokuchi et al. | 423/649 |
| 4,393,039 A | * | 7/1983 | Sherman | 62/114 |
| 4,474,592 A | * | 10/1984 | Kundig | 62/606 |
| 4,765,813 A | * | 8/1988 | Gaumer et al. | 62/606 |
| 5,580,793 A | * | 12/1996 | Wanner | 436/144 |
| 7,040,119 B2 | * | 5/2006 | Bracha et al. | 62/607 |
| 2005/0210914 A1 | * | 9/2005 | Allam et al. | 62/607 |

OTHER PUBLICATIONS

Lipman et al., "Continuous Conversion Hydrogen Liquefaction", Chemical Engineering Progress, 1963, vol. 59, No. 8, p. 49.
Haubach et al., "The Low-Temperature Chromatographic Separation of the Isotopic Hydrogens at 27 and 55°K", 1967.
Clouter, "Application of a Helium Gas Cryogenerator to the Orthohydrogen Separation Process", 1972, vol. 5, p. 1099.
Baker et al., "A Study of the Efficiency of Hydrogen Liquefaction", 1978, vol. 3, p. 321.
Stevenson et al., "Simple Chromatographic Separation of Para- and Ortho-Hydrogen and—Deuterium", 1982, vol. 234, p. 231.

* cited by examiner

*Primary Examiner* — Wayne Langel
(74) *Attorney, Agent, or Firm* — David M. Rosenblum

(57) ABSTRACT

The present invention provides a method of liquefying a hydrogen feed stream and a liquefier for carrying out such a method in which ortho-species of hydrogen contained in a hydrogen feed stream is converted to the para-species in higher and lower temperature catalytic converters. An adsorption unit, located between the higher and lower temperature catalytic converters, adsorbs a portion of the ortho content of the feed stream. The adsorbed portion is desorbed during regeneration of an adsorbent bed of the adsorption unit and is recirculated back for treatment in the higher temperature catalytic converter to reduce the degree to which the ortho-species are converted to the para-species in the lower temperature catalytic converter and at lower temperatures.

15 Claims, 6 Drawing Sheets

HYDROGEN LIQUEFACTION METHOD AND LIQUEFIER

FIELD OF THE INVENTION

The present invention relates to a hydrogen liquefaction method and a liquefier used in conducting such method in which hydrogen containing ortho and para-species of the hydrogen is liquefied to produce a product stream. More particularly, the present invention relates to such a method and liquefier in which the ortho-species are adsorbed at a relatively high temperature within the liquefier to produce a stream that is rich in the para-species and remaining ortho-species contained in the stream are catalytically converted to the para-species at low temperature.

BACKGROUND OF THE INVENTION

Hydrogen is liquefied for many purposes that include the storage and the transport of the hydrogen. Although insulation is provided in connection with vessels used to store and transport hydrogen, as with any cryogen, heat leakage will cause the hydrogen to vaporize and its consequent loss. Another mechanism for the vaporization of hydrogen concerns the fact that the hydrogen to be liquefied normally contains both ortho-species and para-species of the hydrogen that are respectively, triplet and singlet states of hydrogen resulting from a magnetic moment associated with the spin of the proton making up each hydrogen atom. Under ambient conditions, hydrogen will contain roughly 75 percent of the ortho-species and when hydrogen is liquefied, such proportion will be preserved in the liquid hydrogen. The ortho form of the hydrogen is unstable at low temperatures and the ortho form will eventually form the para-species. However, such formation is exothermic and will accelerate the vaporization of hydrogen during transport and storage.

The problem set forth above has been identified in the prior art and liquefiers have been disclosed that incorporate catalysts to catalytically convert the ortho-species of the hydrogen to the para-species of the hydrogen. Since such conversion is exothermic, refrigeration, in addition to that required in liquefying the hydrogen, must be supplied. Practically, since this will require more energy for generating the refrigeration, it has been recognized in the art that the catalytic conversion can take place in both higher and lower temperature locations of the liquefier to avoid catalytic conversion taking place solely at the colder temperature levels. If the exothermic catalytic conversion were to take place only at the colder temperature levels of the liquefier, the liquefaction of the hydrogen would be a particularly energy intensive if not expensive process because a greater proportion of the refrigeration is expended in achieving the colder temperatures that are required for the liquefaction of the hydrogen.

Liquefiers incorporating catalytic conversion of the ortho form of the hydrogen in both higher and lower temperature catalytic converters are disclosed in U.S. Pat. No. 3,095,274, U.S. Pat. No. 3,380,809 and U.S. Pat. No. 4,765,813. For example, in U.S. Pat. No. 4,765,813, the hydrogen is liquefied in a series of heat exchangers that operate at successively lower temperatures. Refrigeration is imparted to the heat exchangers by a closed circuit neon refrigeration loop and externally supplied liquid and gaseous nitrogen streams. A hydrogen feed stream is compressed and combined with a recycle stream that is compressed in a compressor and initially cooled in a warm end heat exchanger and then successively cooled in downstream heat exchangers in which a catalyst is provided within the colder heat exchangers in which mechanically generated refrigeration streams are supplied to convert some of the ortho-species content of the feed into the para-species. After being discharged from the cold end heat exchanger, the resulting stream, enriched in the para-species, is expanded in a dense phase expander into a two-phase stream. The two-phase stream is fed to a converter-separator to separate the two-phase stream into a liquid phase and gaseous phase and to further convert the ortho content of the liquid phase into the para-hydrogen. The further converted liquid phase is removed as the liquid hydrogen product and the vapor phase is recycled as the recycle stream to help cool the hydrogen.

In Vol. 3 International Journal of Hydrogen Energy, "A Study of the Efficiency of Hydrogen Liquefaction." by Baker et al., pp 321-334 (1978), a liquefier is disclosed in which a hydrogen containing feed is compressed and combined with a recycle stream and then cooled in three heat exchangers to form liquid hydrogen. The warmest of the heat exchangers cools the hydrogen to a temperature that is slightly above the liquefaction temperature of nitrogen and cold nitrogen gas is supplied to this heat exchanger to help in the cooling. Thereafter, part of the cooled hydrogen is introduced into a catalytic converter to convert the ortho-species into the para-species within a liquid nitrogen bath. The cold nitrogen vapor resulting from the vaporization of the liquid nitrogen is introduced into the warm heat exchanger. The resulting hydrogen stream, rich in the para-species is then sequentially cooled in two heat exchangers in which mechanical refrigeration is added by expanding the other part of the cooled hydrogen in two separate turboexpanders. The resulting exhaust streams are routed to the two heat exchangers and then the warm end heat exchanger. The exhaust is discharged from the warm end heat exchanger to form part of the recycle stream. After the hydrogen is liquefied, it is then introduced into another catalytic converter to convert more of the ortho-species into the para-species. A portion of the hydrogen introduced into the catalytic converter vaporizes and is recycled back through the heat exchangers to form a remaining part of the recycle to be combined with the hydrogen feed stream.

As will be discussed, among other features, the present invention provides a liquefier incorporating catalytic conversion of the ortho-species of the hydrogen to the para-species in both higher and lower temperature catalytic converters and an adsorption unit that adsorbs the ortho-species of the hydrogen and feeds it to the higher temperature catalytic converter or converters so that the catalytic conversion is driven towards the higher temperature conversion. This reduces the amount of refrigeration and therefore, the amount of energy and cost involved in generating the refrigeration over prior art liquefiers discussed above.

SUMMARY OF THE INVENTION

The present invention, in one aspect, provides a method of liquefying a hydrogen feed stream having both ortho-species and para-species of hydrogen. In accordance with the method, the hydrogen contained within the hydrogen feed stream is liquefied within a hydrogen liquefier to produce a liquid hydrogen product stream. The hydrogen liquefier has heat exchangers operating at successively lower temperatures to cool the hydrogen.

A portion of the ortho-species contained in the hydrogen feed stream is catalytically converted to the para-species in a higher temperature catalytic converter. A further portion of the ortho-species contained in the hydrogen feed stream is adsorbed within an adsorbent of at least one adsorption unit to produce a para-rich stream containing unadsorbed ortho-species. The adsorbent is regenerated within the at least one adsorption unit through desorption to produce the desorbed ortho-species. The desorbed ortho-species is introduced into the higher temperature catalytic converter. At least the para-rich stream is introduced into at least one lower temperature catalytic converter to catalytically convert at least the unadsorbed ortho-species to the para-species, thereby producing an ortho lean stream having a reduced content of the ortho-species as compared with that of the hydrogen feed stream. The liquid hydrogen product stream is formed from the ortho-lean stream.

The higher temperature catalytic converter, the at least one lower temperature catalytic converter and the at least one adsorption unit are all in flow communication with the heat exchangers such that the higher temperature catalytic converter operates at a higher temperature level greater than that of the at least one lower temperature catalytic converter and the at least one adsorption unit has an operational temperature no greater than that of the higher temperature catalytic converter and greater than that of the lower temperature catalytic converter.

Since the portion of the ortho-species contained in the hydrogen feed stream is converted to the para-species at a higher temperature level and such portion includes desorbed ortho-species that are removed prior to catalytic conversion at lower temperature, the degree to which the lower temperature catalytic conversion that would otherwise take place is reduced. Since it is more expensive to supply refrigeration to obtain the lower temperature, the present invention allows for a reduction in costs associated with operating a liquefier in a method in accordance with the present invention. Alternatively, at the same cost associated with operating a liquefier conducting a liquefaction process of the prior art, the present invention allows a greater throughput of hydrogen to be liquefied with a reduced content of the ortho-species.

The hydrogen feed stream can be compressed, combined with at least part of a recycle stream to form a combined hydrogen stream and the combined hydrogen stream is compressed within the hydrogen liquefier. The heat exchangers include a warm end heat exchanger situated at a warm end of the liquefier and a cold end heat exchanger having the cold end temperature and situated at a cold end of the liquefier. The liquid hydrogen product stream is discharged from the cold end of the cold end heat exchanger. The combined hydrogen stream is cooled within the warm end heat exchanger and refrigeration is imparted to the heat exchangers so that the heat exchangers operate at the successively lower temperatures. Part of the refrigeration within the liquefier is imparted to the heat exchangers by cooling a portion of the combined hydrogen stream, dividing the combined hydrogen stream into subsidiary streams that are expanded with the performance of work in at least two turboexpanders operating at least at two of the successively lower temperatures to produce exhaust streams. The two exhaust streams are introduced into at least the cold end heat exchanger and an intermediate temperature heat exchanger situated between the warm end heat exchanger and the cold end heat exchanger. The exhaust streams are combined to produce the recycle stream. Another part of the refrigeration within the liquefier is imparted by two external refrigerant streams that are respectively introduced into the warm end heat exchanger and one of the heat exchangers positioned between the warm end heat exchanger and the cold end heat exchanger.

The combined hydrogen stream is divided into a first hydrogen containing stream and a second hydrogen containing stream. The first hydrogen containing stream is subjected to the adsorption to form the para-rich stream and the portion of the combined hydrogen stream used in generating refrigeration is formed from the second hydrogen containing stream. Further refrigeration is imparted into the liquefier by partly cooling a portion of the second hydrogen containing stream within the cold end heat exchanger, expanding the portion of the second hydrogen containing stream into a two-phase stream and separating the two-phase stream within a phase separator into a vapor phase and a liquid phase. A liquid phase stream composed of the liquid phase is circulated to the cold end heat exchanger and back to the phase separator and a vapor phase stream composed of the vapor phase is introduced into the cold heat exchanger and warmed within the heat exchangers and discharged from the warm end heat exchanger. The vapor phase stream is combined with the hydrogen feed stream and compressed along with the hydrogen feed stream and combined with all of the recycle stream along with the hydrogen feed stream after the compression thereof. The desorbed ortho-species is contained in a waste stream that is combined with the vapor phase stream to recirculate it to the hydrogen feed stream. The para-rich stream is introduced into the lower temperature catalytic converter to form the ortho-lean stream having the reduced ortho-species content.

The para-rich stream can be introduced into the intermediate temperature heat exchanger. The at least one lower temperature catalytic converter is a first lower temperature catalytic converter and a second lower temperature catalytic converter. The para-rich stream is introduced into the first lower temperature catalytic converter and thereafter, the second lower temperature catalytic converter. The first lower temperature catalytic converter and the second lower temperature catalytic converter are located within the intermediate temperature heat exchanger and the cold end heat exchanger, respectively.

The first hydrogen containing stream can pass through the intermediate temperature heat exchanger and the para-rich stream can be introduced into the cold end heat exchanger. The at least one lower temperature catalytic converter is a lower temperature catalytic converter located within the cold end heat exchanger. The first hydrogen containing stream is introduced into the higher temperature catalytic converter forming higher temperature catalytic converter and the higher temperature catalytic converter is located within the intermediate temperature heat exchanger.

The intermediate temperature heat exchanger can be a lower temperature intermediate heat exchanger and the heat exchangers can include a higher temperature intermediate heat exchanger situated between the warm end heat exchanger and the lower temperature intermediate heat exchanger. The first hydrogen containing stream and the second hydrogen containing stream cool within the higher temperature intermediate heat exchanger and the para-rich stream is introduced into the lower temperature intermediate temperature heat exchanger. The first hydrogen containing stream is introduced into the higher temperature catalytic converter. The higher temperature catalytic converter is located within the warmer intermediate temperature heat exchanger.

The part of the ortho-species content of a hydrogen containing process stream is adsorbed in an adsorbent bed unit having at least two adsorbent beds operating in an out-of-phase cycle so that while one of the adsorbent beds is adsorbing the ortho-species content another of the adsorbent beds is desorbing the ortho-species content to form a waste stream containing the desorbed ortho-species. The waste stream can be discharged into the vapor phase stream. The vapor phase stream, after the waste stream is discharged into the vapor phase stream, is introduced into the higher temperature catalytic converter. The higher temperature catalytic converter is located within the warm end heat exchanger. In another embodiment, the waste stream can be discharged into the recycle stream. In such case, the recycle stream is passed through the higher temperature catalytic converter. The higher temperature catalytic converter is located within the warm end heat exchanger.

In yet another embodiment, the combined hydrogen stream can be divided into a first hydrogen containing stream and a second hydrogen containing stream. In such embodiment, the portion of the combined hydrogen stream is formed from the second hydrogen containing stream. Further refrigeration is imparted into the liquefier by partly cooling a portion of the second hydrogen containing stream within the cold end heat exchanger, expanding the portion of the second hydrogen containing stream into a two-phase stream and separating the two-phase stream within a phase separator into a vapor phase and a liquid phase. A liquid phase stream composed of the liquid phase is circulated to the cold end heat exchanger and back to the phase separator. A vapor phase stream, composed of the vapor phase, is introduced into the cold heat exchanger, is then warmed within the heat exchangers and discharged from the warm end heat exchanger. The vapor phase stream is combined with the hydrogen feed stream and compressed along with the hydrogen feed stream and combined with a first part of the recycle stream along with the hydrogen feed stream after the compression thereof, thereby to form the combined stream. The para-rich stream in such embodiment is a para-rich recycle stream that is formed by adsorbing the part of the ortho-species content of the second part of the recycle stream to produce the para-rich recycle stream. The para-rich recycle stream is thereafter, warmed in the warm end heat exchanger, compressed and recooled in the warm end heat exchanger. The para-rich recycle stream is combined with the first hydrogen containing stream to form a combined para-rich stream.

The combined para-rich stream is introduced into the intermediate temperature heat exchanger. The at least one lower temperature catalytic converter is a first lower temperature catalytic converter and a second lower temperature catalytic converter. The combined para-rich stream is introduced into the first lower temperature catalytic converter and thereafter, the second lower temperature catalytic converter. The first lower temperature catalytic converter and the second lower temperature catalytic converter are located within the intermediate temperature heat exchanger and the cold end heat exchanger, respectively.

The part of the ortho-species content of a hydrogen containing process stream is adsorbed in an adsorbent bed unit having at least two adsorbent beds operating in an out-of-phase cycle so that while one of the adsorbent beds is adsorbing the ortho-species content another of the adsorbent beds is desorbing the ortho-species content to form a waste stream containing the desorbed ortho-species. The waste stream can be discharged into the vapor phase stream. After discharge of the waste stream into the vapor phase stream, the vapor phase stream is introduced into the higher temperature catalytic converter. The higher temperature catalytic converter that is located within the warm end heat exchanger.

In any embodiment having a single intermediate temperature heat exchanger, the one of the heat exchangers positioned between the warm end heat exchanger and the cold end heat exchanger is the intermediate temperature heat exchanger. In the embodiment having warmer and colder temperature intermediate heat exchangers, the one of the heat exchangers positioned between the warm end heat exchanger and the colder intermediate temperature heat exchanger is the warmer temperature intermediate heat exchanger.

In any embodiment, the liquid hydrogen product stream can be formed by discharging the ortho-lean stream from the cold end heat exchanger and expanding the ortho-lean stream. The ortho-lean stream is cooled, after having been expanded, within the cold end heat exchanger and then discharged from the cold end heat exchanger as the liquid hydrogen product stream.

In another aspect, the present invention provides a liquefier for liquefying a hydrogen feed stream having both ortho-species and para-species of hydrogen to produce a liquid hydrogen product stream. The liquefier comprises a compression system for compressing the hydrogen contained in the hydrogen feed stream, heat exchangers serially connected to one another and to the compression system to cool the hydrogen within the feed stream and a refrigeration system. The refrigeration system is connected to the heat exchangers and is configured to supply refrigeration to the heat exchangers such that the heat exchangers operate at successively lower temperatures.

A higher temperature catalytic converter is provided for converting a portion of the ortho-species contained in the hydrogen feed stream to the para-species. The portion of the ortho-species includes desorbed ortho-species. At least one adsorption unit having adsorbent beds operating in an out-of-phase cycle is provided such that a further portion of the ortho-species contained in the hydrogen feed stream is adsorbed and a para-rich stream is produced having unadsorbed ortho-species while another adsorbent bed is undergoing regeneration and desorbing the ortho-species, thereby producing the desorbed ortho-species. At least one lower temperature catalytic converter is provided for catalytically converting at least the unadsorbed ortho-species contained in the para-rich stream to the para-species, thereby forming an ortho-lean stream having a reduced concentration of the ortho-species compared to the hydrogen feed stream. The at least one adsorption unit is in flow communication with the higher temperature catalytic converter so that the desorbed ortho-species is fed to the higher temperature catalytic converter. Such adsorption unit or units are also in flow communication with the lower temperature catalytic converter so that the unadsorbed ortho-species contained in the para-rich stream are fed to the at least one lower temperature catalytic converter. An outlet is provided in flow communication with the lower temperature catalytic converter to discharge a liquid hydrogen product stream composed of the ortho-lean stream.

The higher temperature catalytic converter, the lower temperature catalytic converter and the at least one adsorption unit are also in flow communication with the heat exchangers such that the higher temperature catalytic converter operates at a higher temperature level greater than that of the at least one lower temperature catalytic converter and the at least one adsorption unit has an operational temperature no greater than that of the higher temperature catalytic converter and greater than the lower temperature catalytic converter.

The compression system can include a feed compressor to compress the hydrogen feed stream and a recycle compressor connected to the feed compressor such that at least part of a recycle stream is compressed and is combined with the hydrogen feed stream after having been compressed to form a combined hydrogen stream. The heat exchangers include a warm end heat exchanger for receiving the hydrogen compressed in the compression system and a cold end heat exchanger for discharging a liquid hydrogen product stream. The warm end heat exchanger is connected to the compression system such that the combined hydrogen stream cools within the warm end heat exchanger.

The refrigeration system includes two turboexpanders operating at two of the successively lower temperatures. The two turboexpanders are connected to the heat exchangers so that a portion of the combined hydrogen stream is cooled, divided into subsidiary streams that are expanded with the performance of work in the two turboexpanders to produce exhaust streams that are introduced into at least the cold end heat exchanger and an intermediate temperature heat exchanger situated between the warm end heat exchanger and the cold end heat exchanger and are combined to produce the recycle stream. The refrigeration system also includes the warm end heat exchanger and one of the heat exchangers positioned between the warm end heat exchanger and the cold end heat exchanger having heat exchange passages configured to receive two external refrigerant streams that are respectively introduced into the warm end heat exchanger and the one heat exchanger positioned between the warm end heat exchanger and the cold end heat exchanger.

An adsorption unit that constitutes that at least one adsorption unit and the at least two turboexpanders can be in flow communication with the warm end heat exchanger such that a first hydrogen containing stream formed from part of the combined hydrogen stream is subjected to adsorption within the absorption unit and the portion of the combined hydrogen stream is a second hydrogen containing stream formed from a remaining part of the combined hydrogen stream. The refrigeration system also includes the cold end heat exchanger having a passageway to partly cool a portion of the second hydrogen containing stream and a closed recirculation loop connected to the passageway having an expansion valve to expand a portion of the second hydrogen containing stream into a two-phase stream and a phase separator to separate the two-phase stream into a vapor phase and a liquid phase. The phase separator is connected within the closed recirculation loop such that a liquid phase stream composed of the liquid phase is circulated to the cold end heat exchanger and back through the expansion valve to the phase separator. The heat exchangers are connected to the phase separator and configured such that a vapor phase stream is introduced into the cold end heat exchanger, warms within the heat exchangers and is discharged from the warm heat exchanger. The feed compressor is in flow communication with the warm end heat exchanger such that the vapor phase stream is combined with the hydrogen feed stream and compressed along with the hydrogen feed stream and combined with all of the recycle stream along with the hydrogen feed stream after the compression thereof.

In one embodiment, the adsorption unit is connected between the warm end heat exchanger and the intermediate temperature heat exchanger such that the para-rich stream is introduced into the intermediate temperature heat exchanger. The at least one lower temperature catalytic converter is a first lower temperature catalytic converter located within the intermediate temperature heat exchanger and a second lower temperature catalytic converter located in the cold end heat exchanger. The first and second lower temperature catalytic converters are in communication with the adsorption unit to receive the para-rich stream.

The adsorption unit can be connected between the intermediate temperature heat exchanger and the cold end heat exchanger such that the first hydrogen containing stream passes through the intermediate temperature heat exchanger before the adsorption unit and the para-rich stream is introduced into the cold end heat exchanger. The at least one lower temperature catalytic converter is one lower temperature catalytic converter located within the cold end heat exchanger and in flow communication with the adsorption unit to receive the para-rich stream. The higher temperature catalytic converter is located within the intermediate temperature heat exchanger and is positioned to receive the first hydrogen containing stream.

In a specific embodiment, the intermediate temperature heat exchanger is a lower temperature intermediate heat exchanger positioned adjacent to the cold end heat exchanger. The heat exchangers include a higher temperature intermediate heat exchanger that is positioned between the lower temperature intermediate heat exchanger and the warm end heat exchanger. The higher temperature intermediate heat exchanger is connected to the warm end heat exchanger so that the first hydrogen containing stream and the second hydrogen containing stream cool within the higher temperature intermediate heat exchanger. The at least one adsorption unit is located between the higher temperature intermediate heat exchanger and the lower temperature intermediate heat exchanger so that the para-rich stream is introduced into the lower temperature intermediate heat exchanger. The higher temperature catalytic converter is located within the higher temperature intermediate heat exchanger such that the first hydrogen containing stream is received in the one higher temperature catalytic converter.

The adsorption unit can have at least two adsorbent beds operating in an out-of-phase cycle so that while one of the adsorbent beds is adsorbing the ortho-species content, another of the adsorbent beds is desorbing the ortho-species content to form a waste stream. The adsorption bed unit can be in flow communication with the heat exchangers so that waste stream is discharged into the vapor phase stream. The higher temperature catalytic converter is located in the warm end heat exchanger and is positioned to receive the vapor phase stream after discharge of the waste stream into the vapor phase stream.

In another embodiment, the adsorption bed unit is in flow communication with the heat exchangers so that the waste stream is discharged into the recycle stream. The higher temperature catalytic converter is located in the warm end heat exchanger and positioned to receive the recycle stream.

In a further embodiment, the at least two turboexpanders are in flow communication with the warm end heat exchanger such that a first hydrogen containing stream formed from part of the combined hydrogen stream and the portion of the combined hydrogen stream is a second hydrogen containing stream formed from a remaining part of the combined hydrogen stream. The refrigeration system also includes the cold end heat exchanger having a passageway to partly cool a portion of the second hydrogen containing stream, a closed recirculation loop connected to the passageway having an expansion valve to expand a portion of the second hydrogen containing stream into a two-phase stream and a phase separator to separate the two-phase stream into a vapor phase and a liquid phase. The phase separator is connected within the closed recirculation loop such that a liquid phase stream composed of the liquid phase is circulated to the cold end heat exchanger and back through the expansion valve to the phase separator. The heat exchangers are connected to the phase separator and are configured such that a vapor phase stream, composed of the vapor phase, is introduced into the cold end heat exchanger, warms within the heat exchangers and is discharged from the warm end heat exchanger at the warm end temperature thereof. The feed compressor is in flow communication with the warm end heat exchanger such that the vapor phase stream is combined with the hydrogen feed stream and compressed along with the hydrogen feed stream and combined with all of the recycle stream along with the hydrogen feed stream after the compression thereof. The warm end heat exchanger and the adsorption unit are connected to the refrigeration system so that the portion of the recycle stream is a first part of the recycle stream. The adsorption unit is connected to the warm end heat exchanger so that a second part of the recycle stream is introduced into the adsorption unit to form a para-rich recycle stream that constitutes the para-rich stream. The para-rich recycle stream thereafter warms in the warm end heat exchanger. Another recycle compressor is connected to the warm end heat exchanger so that the para-rich recycle stream is compressed and then cooled. A juncture combines the para-rich recycle stream with the first hydrogen containing stream to form a combined para-rich stream. The at least one lower temperature catalytic converter is in flow communication with the juncture to receive the combined para-rich stream.

The juncture is in flow communication with the intermediate temperature heat exchanger such that the combined para-rich stream is introduced into the intermediate temperature heat exchanger. The at least one lower temperature catalytic converter is a first lower temperature catalytic converter located within the intermediate temperature heat exchanger and a second lower temperature catalytic conversion unit located in the cold end heat exchanger.

In the above embodiment, the adsorption unit can have at least two adsorbent beds operating in an out-of-phase cycle so that while one of the adsorbent beds is adsorbing the ortho-species content, another of the adsorbent beds is desorbing the ortho-species content to form a waste stream. The adsorption unit is in flow communication with the heat exchangers so that waste stream is discharged into the vapor phase stream. The higher temperature catalytic converter is located in the warm end heat exchanger and positioned to receive the vapor phase stream after discharge of the waste stream into the vapor phase stream.

In an embodiment of the present invention having solely an intermediate temperature heat exchanger, the one of the heat exchangers positioned between the warm end heat exchanger and the cold end heat exchanger is the intermediate temperature heat exchanger. In an embodiment having the higher and the lower temperature intermediate heat exchangers, the one of the heat exchangers positioned between the warm end heat exchanger and the lower temperature intermediate heat exchanger is the higher temperature intermediate heat exchanger.

In an embodiment of the present invention, another expansion valve can be connected to the cold end heat exchanger to expand the ortho-lean stream upon discharge from the cold end heat exchanger. The cold end heat exchanger is configured to cool the ortho-lean stream after having been expanded and to discharge the liquid hydrogen product stream therefrom and form the outlet of the liquefier.

BRIEF DESCRIPTION OF THE DRAWINGS

While the specification concludes with claims distinctly pointing out the subject matter that Applicants regard as their invention, it is believed that the invention will be better understood when taken in connection with the accompanying drawings in which:

DETAILED DESCRIPTION

Figure 1:
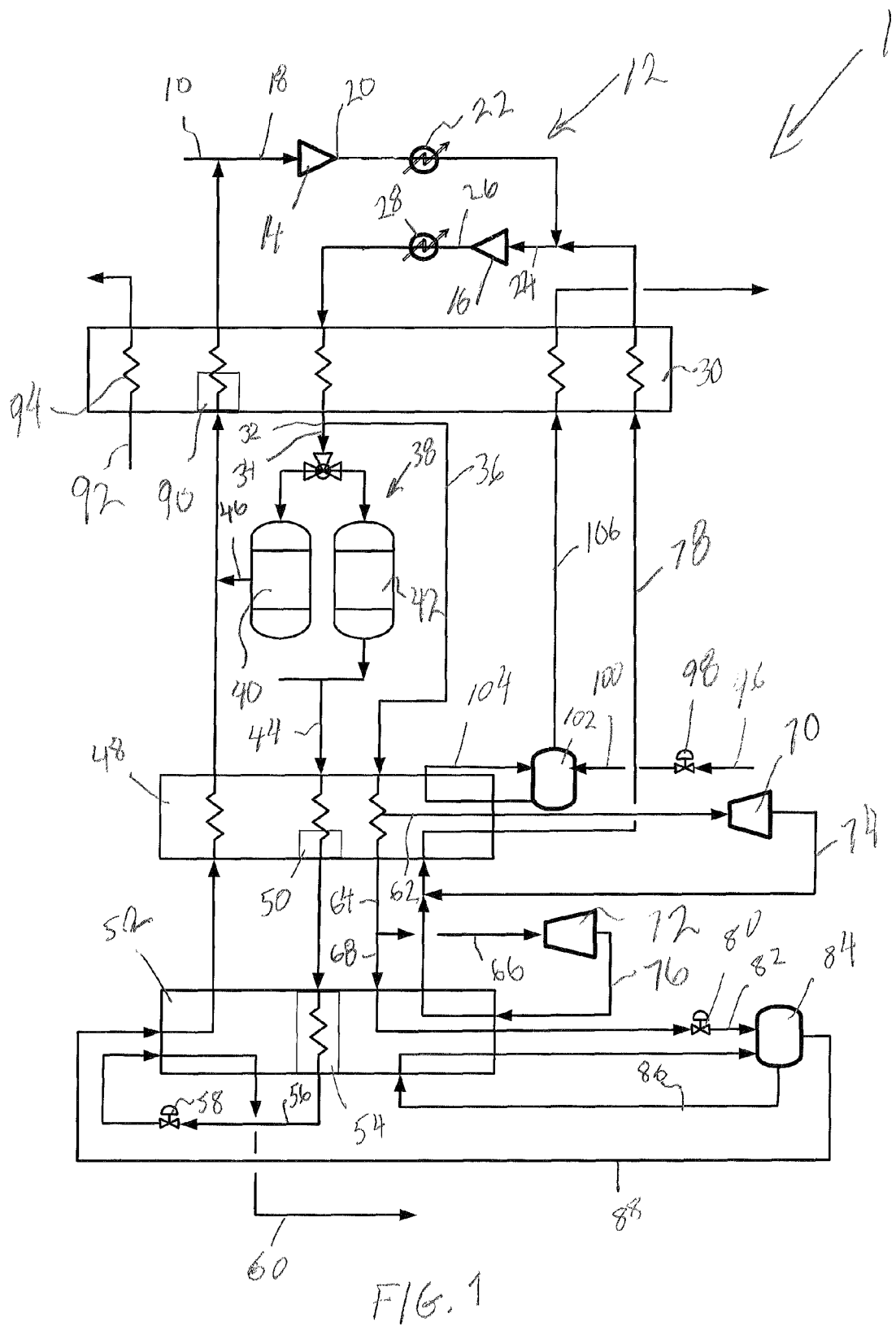
FIG. 1 is a schematic process flow diagram of an apparatus for carrying out a method in accordance with the present invention.

With reference to FIG. 1, a liquefier 1 is illustrated for liquefying hydrogen contained in a hydrogen feed stream 10. Hydrogen feed stream 10 contains both the ortho and para-species of hydrogen. As indicated above, at standard ambient temperature conditions, the proportion is about 75 percent of the ortho-species and 25 percent of the para-species.

It is to be noted that there are many different types of liquefiers that have been employed in the liquefaction of hydrogen. The illustrated liquefier 1, as will be discussed, utilizes successively colder heat exchangers in which that refrigeration that is imparted to the heat exchangers to obtain the colder temperatures is generated by both mechanical means and externally supplied refrigerant streams. However, as would be known, liquefiers have been constructed that employ external refrigeration alone, different mechanical systems for generating refrigeration and other different process flows incorporating different arrangements of heat exchangers. In this regard, the present invention would have applicability to such other liquefier designs.

The hydrogen contained in hydrogen feed stream 10 is compressed by a compression system 12 that includes a feed compressor 14 and a recycle compressor 16. In the illustrated embodiment, the hydrogen feed stream 10 is combined with a vapor phase stream 88, discussed hereinafter, to produce a combined feed stream 18. As illustrated, the feed compressor 14 thus compresses the hydrogen feed stream 10 along with the vapor phase stream 88. The resulting compressed stream 20 is thereafter cooled in an after-cooler 22 and combined with a recycle stream 78, discussed below. The resulting combined stream 24 is thereafter compressed by the recycle compressor 16 to form a compressed combined stream 26 from which the heat of compression is removed by an after-cooler 28.

Compressed, combined stream 26 is then introduced into a warm end heat exchanger 30 at about ambient temperature and is cooled to a temperature of about 80 to 85K. In this regard, the term "warm end heat exchanger" as used herein and in the claims means a heat exchanger having a warm end at which the streams enter to be cooled at the highest operational temperature of the heat exchangers employed within the hydrogen liquefier 1. It is to be noted here that any of the heat exchangers employed in connection with the present invention are of known plate fin design in which plates are connected to one another to form passageways for flow of a fluid to be warmed or cooled and that incorporate heat transfer enhancing fins. For any one stream, there can be a series of passages that are employed within the heat exchanger to cool or warm the stream as may be required.

Thereafter, the compressed combined stream 26 is divided at a junction 32 into a first hydrogen containing stream 34 and a second hydrogen containing stream 36. As will be discussed, second hydrogen containing stream 36 is used in connection with the generation of refrigeration that is supplied to cool the hydrogen to liquefaction temperatures. First hydrogen containing stream 34 is introduced into an adsorption unit 38 having adsorption beds 40 and 42. The adsorbent contained in such beds is capable of adsorbing the ortho-species from the incoming hydrogen to produce a para-rich stream 44, or in other words, a hydrogen stream enriched in the para-species beyond that which would otherwise exist under equilibrium conditions at the temperature of the first hydrogen containing stream 34. In the illustrated embodiment, the para-rich stream contains about 75 percent of the para-species and 25 percent ortho-species. It is to be noted here that the inventors herein have found that the adsorbent is capable of selectively adsorbing the ortho-species at a temperature of about 150K and below and can be made of a zeolite, such as LiX, or γ-alumina. Thus, the warm end heat exchanger 30 must function to at least cool the compressed combined stream 26 to such temperature when using such adsorbent. As can appreciated in a more complex liquefier having more heat exchangers, more than one adsorption unit 38 could be used. The operation of adsorbent unit 38 will be described in more detail hereinafter with respect to FIG. 2.

The para-rich stream 44 is then introduced into an intermediate temperature heat exchanger 48 in which the para-rich stream 44 is both cooled and subjected to a catalytic conversion within a lower temperature catalytic converter 50. Here the term, "intermediate temperature heat exchanger" as used herein and the claims means a heat exchanger having a warm end temperature no greater than the temperature of the cold end temperature of the warm end heat exchanger discussed above and no less than warm end temperature of the cold end heat exchanger 52 to be discussed hereinafter. The lower temperature catalytic converter consists of catalyst partially loaded into the passageways of the heat exchanger 48 being used to cool the para-rich stream 44. As illustrated, the catalyst begins in the middle of the intermediate temperature heat exchanger 50 because the expected para content of the para-rich stream 44 is higher than the para content at equilibrium at the inlet temperature of the intermediate temperature heat exchanger 48, but less than the para content at equilibrium at the outlet temperature of the intermediate temperature heat exchanger 48. The inlet temperature of the catalyst bed 50 should be the temperature at which the para-rich stream 44 is at equilibrium. Higher temperatures will lead to conversion of para-species to ortho-species and lower temperatures will lead to ortho-para conversion occurring at lower temperatures, with more refrigeration energy required, than is necessary. The para-rich stream 44 then proceeds to the cold end heat exchanger 52, in which it is sufficiently cooled to the liquefaction temperature of the hydrogen. As used herein and in the claims, the term "cold end heat exchanger" means a heat exchanger having the lowest cold end temperature of the heat exchangers employed within the liquefier 1. At the same time, the para-rich stream 44 is subjected to catalytic conversion within another lower temperature catalytic converter 54 to produce an ortho-lean stream 56 containing liquid hydrogen that itself contains about 95 percent or greater of the para-species. Catalyst extends the full length of the passages within catalytic converter 54 to essentially extend catalyst bed 50 to lower temperatures because it is assumed that the para-species content of stream 44 is less than the para-species content at equilibrium at the inlet temperature of cold end heat exchanger 52. If it is greater, catalyst bed 50 will be removed and the inlet to catalyst bed 54 should be located at the temperature at which the para-rich stream 44 is at equilibrium, similar to the discussion of the inlet temperature for catalyst bed 50 above. While the ortho-lean stream 56 could be used as a high pressure liquid hydrogen stream, preferably, it is reduced in pressure by an expansion valve 58. This causes the liquid hydrogen to warm and therefore, the ortho-lean stream, reduced in pressure, is reintroduced into the cold end heat exchanger 52 where it is cooled again to produce the liquid hydrogen product stream 60.

As can be appreciated, the lower temperature catalytic converters 50 and 54 could be separate beds located externally to the respective intermediate temperature and cold end heat exchangers 48 and 52.

As indicated above, in order to cool the hydrogen to liquefaction temperatures, refrigeration is imparted to the liquefier 1 and the compressed hydrogen flowing within the liquefier 1 by way of a refrigeration system that has mechanical components and external refrigeration streams. In this regard, the second hydrogen containing stream 36, is cooled in the intermediate temperature heat exchanger 48. After it is partially cooled, it is divided into first and second subsidiary streams 62 and 64. Subsidiary stream 64 cooled to the cold end temperature of intermediate temperature heat exchanger 48 is then divided into third and fourth subsidiary streams 66 and 68. First subsidiary stream 62 and third subsidiary stream 66 are introduced into turboexpanders 70 and 72 that operate at successively lower temperature levels and thus, produce exhaust streams 74 and 76, respectively, through performance of work. In this regard, since hydrogen can actually increase in temperature upon expansion within certain temperature ranges, it is necessary that the heat exchangers 30, 48 and 52 operate such that the first subsidiary stream 62 and the third subsidiary stream 66 are at a temperature of between about 30K and about 200K. Exhaust stream 76 is introduced into an intermediate location of cold end heat exchanger 52 to impart refrigeration into such heat exchanger and is then combined with exhaust stream 74 at the warm end thereof to produce the recycle stream 78. Recycle stream 78 is then introduced into the intermediate temperature heat exchanger 48 and then the warm end heat exchanger 30 to impart refrigeration into such heat exchangers. Thereafter, recycle stream 78 is combined with the combined hydrogen feed stream 18, after having been compressed in feed compressor 14 and subjected to a higher temperature catalytic conversion in higher temperature catalytic converter 22 and after cooling within aftercooler 23, to produce combined stream 24.

The fourth subsidiary stream 68 is introduced into cold end heat exchanger 52 and partially cooled to an intermediate temperature between the warm and cold ends thereof and expanded in an expansion valve 80 to produce a two-phase stream 82. The liquid and vapor phases of two-phase stream 82 are separated in a phase separator 84. A liquid phase stream 86 composed of the liquid phase circulates in a closed loop passing through cold end heat exchanger 52 to impart additional refrigeration to such heat exchanger. The liquid phase stream 86 partially vaporizes and is reintroduced into phase separator 84. A vapor phase stream 88, composed of the vapor phase is then used to impart additional refrigeration to the cold end heat exchanger 52, the intermediate temperature heat exchanger 48 and the warm end heat exchanger 30 by being introduced into such heat exchangers and successively warmed therein.

The waste stream 46, rich in desorbed ortho-species is introduced into the vapor phase stream 88 between the warm end heat exchanger 30 and the intermediate temperature heat exchanger 48. The ortho-species content of the vapor phase stream 88, contributed by the waste stream 46, is then treated by subjecting the vapor phase stream 88 to catalytic conversion within a higher temperature catalytic converter 90 located within the warm end heat exchanger 30. This location is the minimum possible temperature that enables use of external refrigeration stream 92, which is a lower cost source of refrigeration than those used at lower temperatures. Operating the catalytic converter at lower temperatures increases equilibrium conversion of ortho-species to para-species. This will lead to increased para hydrogen content in streams 18, 24, and 34. Maximizing the extent of ortho to para conversion using lower cost refrigeration reduces the cost of refrigeration for the hydrogen liquefaction process. This advantage can be realized only if para hydrogen does not spontaneously convert to ortho hydrogen at higher temperatures in the liquefier, which could happen if the materials of construction used in the liquefier catalyze the ortho-para reaction. The higher temperature catalytic converter 90 is constructed by partly filling the relevant heat exchange passages of warm end heat exchanger 30 with catalyst. The vapor phase stream 88 is then combined with the hydrogen feed stream for compression within feed compressor 14 as the combined feed stream 18.

The refrigeration system of liquefier 1 also includes an external source of refrigeration provided by nitrogen. A cold nitrogen gas stream 92 is introduced into passages 94 within warm end heat exchanger 30 for such purposes. Additionally, a liquid nitrogen stream 96, at pressure, is introduced into an expansion valve 98 to produce a two-phase nitrogen stream 100. Two-phase nitrogen stream 100 is then introduced into phase separator 102 to separate the liquid and the vapor phases. A liquid nitrogen phase stream 104 is circulated in a closed loop passing through intermediate temperature heat exchanger 48 and back to the phase separator 102. A nitrogen vapor phase 106 composed of the vapor phase is introduced into warm heat exchanger 30 and discharged.

As is apparent, a portion of the ortho-species content of the hydrogen feed stream 10, namely, the desorbed ortho content contributed by waste stream 46 that is recirculated back to the feed by vapor phase stream 88, is converted to the para-species within higher temperature catalytic converter 90. The adsorption unit 38 therefore removes ortho-species content of the hydrogen feed stream 10 to produce the para-rich stream 44 that also contains unadsorbed ortho-species. However in liquefier 1, there will be a reduction in the amount of the ortho-species to be converted at lower temperatures, within lower temperature catalytic converters 50 and 54, given that the adsorbed ortho-species, once desorbed, are converted to the para-species within a higher temperature catalytic converter 90. If the materials of the liquefier have a sufficient amount of paramagnetic material to catalyze ortho-para conversion, the higher temperature catalytic converter can be located at the compressor discharge of feed compressor 14 or on the recycle stream 78 exiting the warm end heat exchanger before its combination with the feed stream. This is because a higher temperature catalytic converter operating in the warmer intermediate temperature heat exchanger will produce a stream that contains more than 25 percent para hydrogen, representing an advantage over the prior art. If the additional para hydrogen will revert to ortho hydrogen in the liquefier because of its materials of construction, the advantage is greatly reduced and the preferred location of the higher temperature catalytic converter will be at ambient temperature where some desorbed ortho-species can be converted to form a stream with approximately 25 percent para-species and heat is most easily removed. In either case, it is preferable to have only one higher temperature catalytic converter, but its location depends on whether the advantage of locating the higher temperature catalytic converter in the warmer intermediate temperature heat exchanger can be maintained or not.

As is apparent from the description of liquefier 1, the higher temperature catalytic converter 90 and the lower temperature catalytic converters 50 and 54, as well as the adsorption unit 38 are all in flow communication with the heat exchangers 30, 48 and 52. As such, the operational temperatures of such devices and the unit operations being conducted will be set by the operational temperatures of the heat exchangers. Thus, the higher temperature catalytic conversion unit operates at higher temperature levels than those of the lower temperature catalytic converters 50 and 54. The adsorption unit will operate at a temperature level no greater than the temperature level of the higher temperature catalytic converters 90 and 22 and greater than that of the lower temperature catalytic converters 50 and 54. Thus, the adsorption unit 38 is acting to push the catalytic conversion, which is exothermic, to warmer temperature levels. The advantage of this is that in order to obtain the lower temperature levels within liquefier 1, more refrigeration is expended at such levels than at the higher levels and therefore, the reduction in the amount of catalytic conversion in the lower temperature catalytic converters 50 and 54 therefore represents a reduction in the amount of refrigeration to be expended at lower level. Since the refrigeration is obtained at such lower temperature levels by mechanical means that involve compression, there is a power savings associated with the reduction in refrigeration. Additionally, as will be discussed, since external liquid refrigeration is supplied, the reduction in refrigeration also impacts the costs involved in supplying such external refrigeration.

It is to be noted, that typically, the ortho-species content of hydrogen feed stream 10 at standard ambient conditions is about 75 mol percent ortho-species, remainder para-species. Preferably, para-rich stream 44 has about 75 mol percent of the para-species and this is increased as described above. Having said this, it is possible to conduct a process in accordance with the present invention that is less efficient, namely to produce para-rich stream 44 with a lower content of the para-species. However, this increases the refrigeration requirements for liquefier 1.

Figure 2:
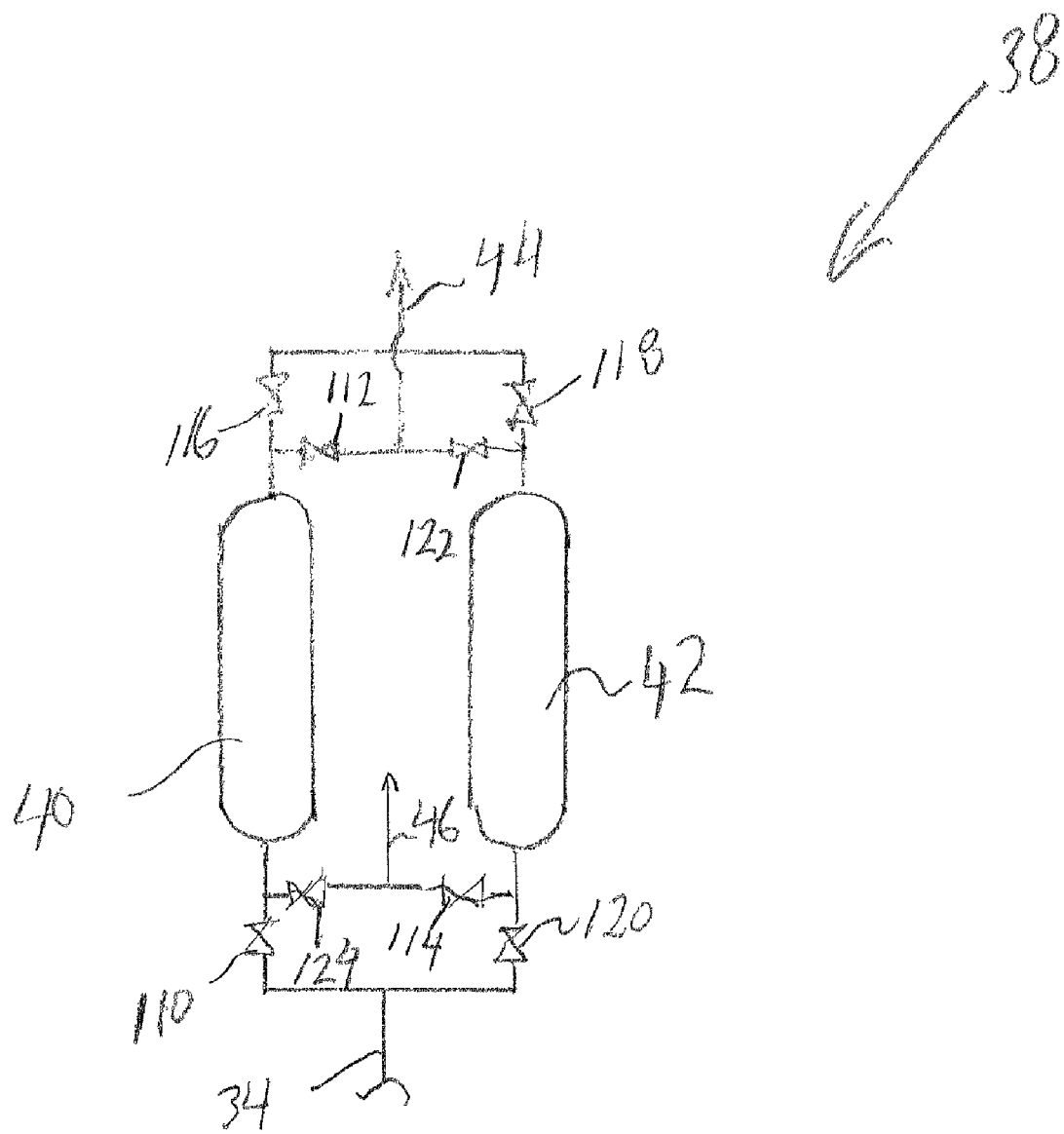
FIG. 2 is a schematic process flow diagram of an adsorption unit used in FIG. 1.

With reference to FIG. 2, adsorption unit 38 is illustrated in more detail. Adsorption unit 38 operates in accordance with an out-of-phase cycle known as a pressure swing adsorption cycle. While adsorbent bed 40 is on line and adsorbing impurities, adsorbent bed 42 is off line and being regenerated. Once adsorbent bed 42 has been regenerated, it is brought back on line and adsorbent bed 40 is regenerated and is off line. More specifically when adsorbent bed 40 is on line, valves 110 and valves 112 are set in open positions to deliver the para-rich stream 44. Valve 114 is also set in an open position to subject adsorbent bed 42 to a blowdown step in which it depressurizes through its inlet to desorb the previously adsorbed ortho-species and thereby to discharge desorbed ortho products as waste stream 46. All other valves are closed. Valves 116 and 118 are next set in open positions to subject adsorbent bed 42 to a purge step in which part of the para-rich product of adsorbent bed 40 making up para-rich stream 44 flows into adsorbent bed 42 driving ortho-species out of adsorbent bed 42 in the formation of waste stream 46. Thereafter, valves 114, 116 and 118 are reset in closed positions and valve 120 is set in an open position to allow adsorbent bed 42 to repressurize. Once brought back up to pressure, valve 122 is set in an open position and valves 110 and 112 are set in closed positions to bring adsorbent bed 40 off-line and adsorbent bed 42 on-line. Valve 124 is set to an open position to subject adsorbent bed 40 to the blowdown step. Valves 116 and 118 are next set in open positions to subject adsorbent bed 40 to a purge step and thereafter valves 116, 118 and 124 are set in closed positions and valve 110 is reset in the open position to repressurize adsorbent bed 40 prior to be brought back on line.

It is to be noted that as could be appreciated by those skilled in the art, a pressure swing adsorption unit could be used that had multiple beds. Vacuum pressure swing adsorption could also be used. Such cycles as temperature swing adsorption could also be used, but are disadvantaged because a heated stream would have to be used for regeneration purposes that would increase the refrigeration requirement involved in cooling down the adsorbent bed. As can also be appreciated, since there are many different types of hydrogen liquefiers to which the present invention has applicability, there could be multiple adsorption units positioned between multiple heat exchangers. By the same token, in such a liquefier, there might also be multiple stages of higher and lower temperature catalytic conversion.

Figure 3:
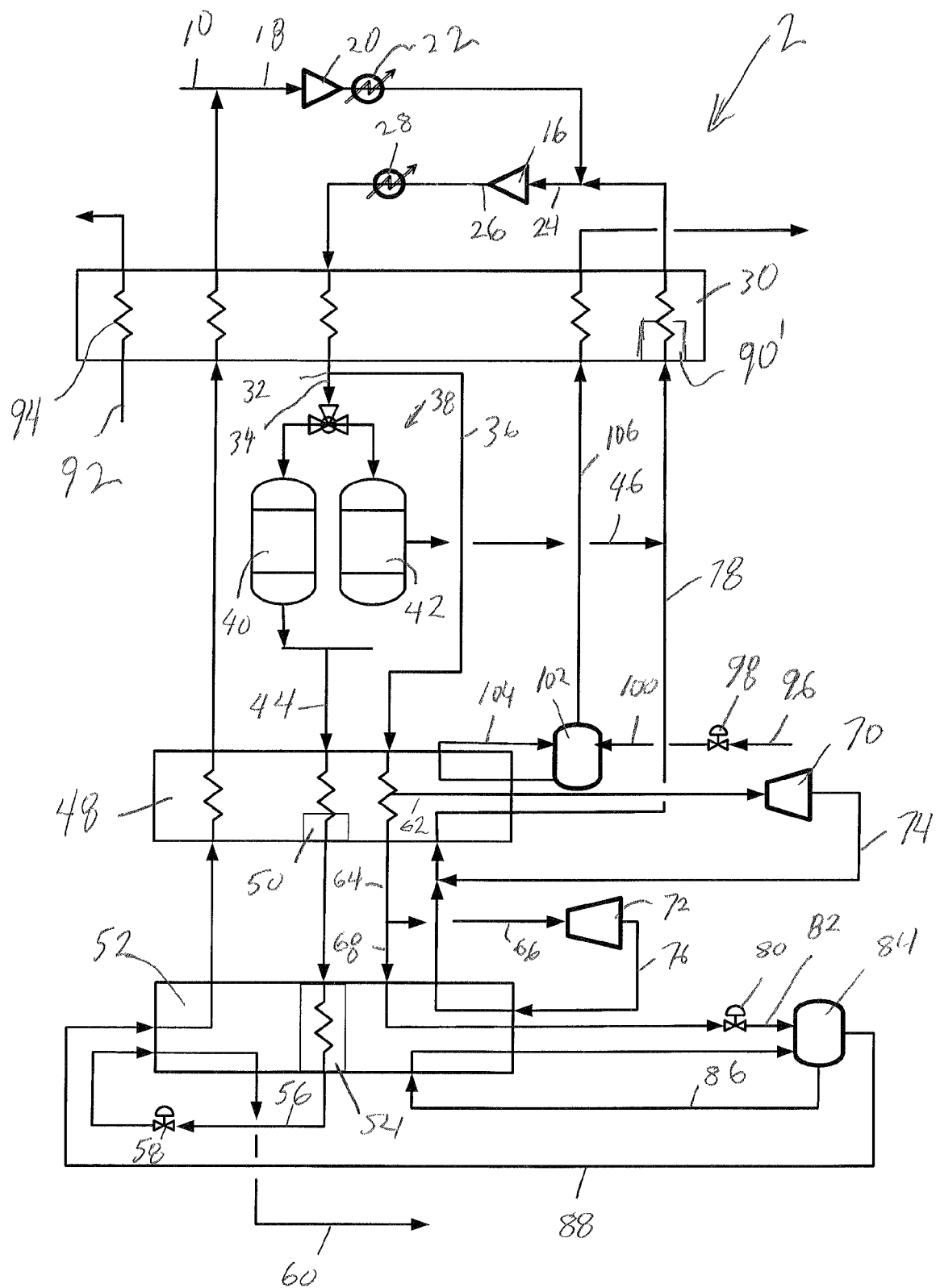
FIG. 3 is an alternative embodiment of an apparatus for carrying out a method in accordance with the present invention.

With reference to FIG. 3 a liquefier 2 is illustrated that operates in the same manner as liquefier 1 except that the waste stream 46 is discharged into the recycle stream 78. As such, the higher temperature catalytic converter 90' is used to convert the desorbed ortho-species content of the recycle stream 78 contributed by the waste stream 46 into the para-species. Higher temperature catalytic converter 90' has the same description as unit 90, discussed above. The reason for this is that recycle stream 78 contains the desorbed hydrogen, so it is the stream to be sent to the higher temperature catalytic converter instead of vapor phase stream 88 as in FIG. 1. The higher temperature catalytic converter 90' is located at the cold end of warm end heat exchanger 30 for the same reasons that higher temperature catalytic converter 90 was located there in FIG. 1. Only the stream to be converted has changed, not the location of the higher temperature catalytic converter.

Figure 4:
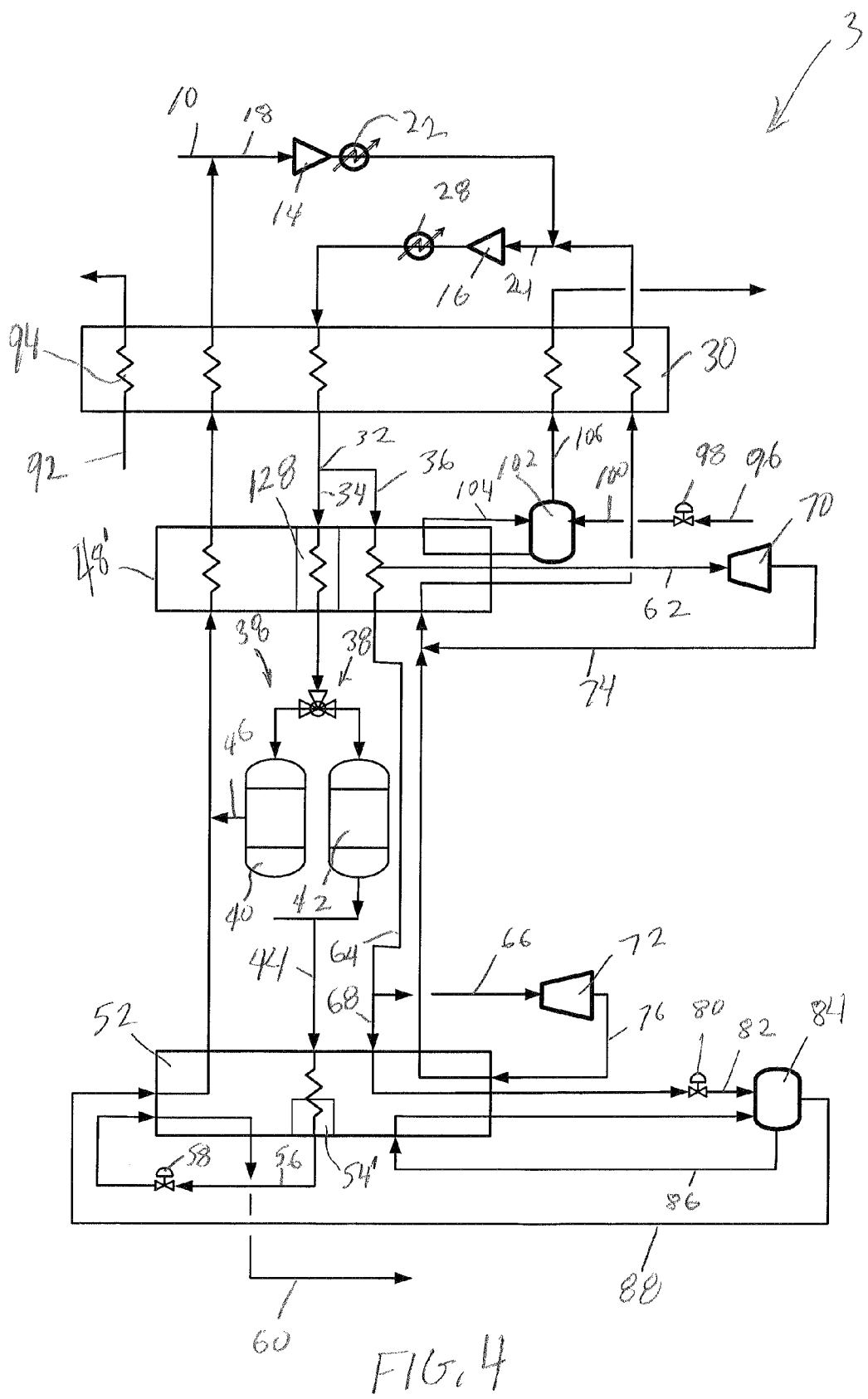
FIG. 4 is a schematic process flow diagram of an alternative embodiment of an apparatus for carrying out a method in accordance with the present invention.

With reference to FIG. 4, a liquefier 3 is illustrated that differs from the liquefier shown in FIG. 1 by virtue of the adsorption unit being positioned between the intermediate temperature heat exchanger 48 and the cold end heat exchanger 52. In this embodiment, however, rather than utilizing the higher temperature catalytic converter 90, a higher temperature catalytic converter 128 is used in an intermediate temperature heat exchanger 48' that is similar to intermediate temperature heat exchanger 48, with the provision of the passages, that would be otherwise used in the cooling of the para-rich stream 44, used instead for the cooling of the first hydrogen containing stream 34. Additionally such passages are filed with conversion catalyst to form the higher temperature catalytic converter 128. As is apparent, the catalytic converter 128 is converting desorbed ortho-species contributed by way of waste stream 46 to vapor phase stream 88 as well as ortho-species in the incoming feed stream 10. The advantage of such arrangement is that this maximizes the para-species content of the adsorbent feed stream 38. This will maximize the para-species content of the para-enriched stream 42, reducing the required inlet temperature of lower temperature catalytic converter 54' and reducing the amount of ortho-para conversion to be conducted in the lower temperature catalytic converter, which reduces the refrigeration required to operate the lower temperature catalytic converter.

Figure 5:
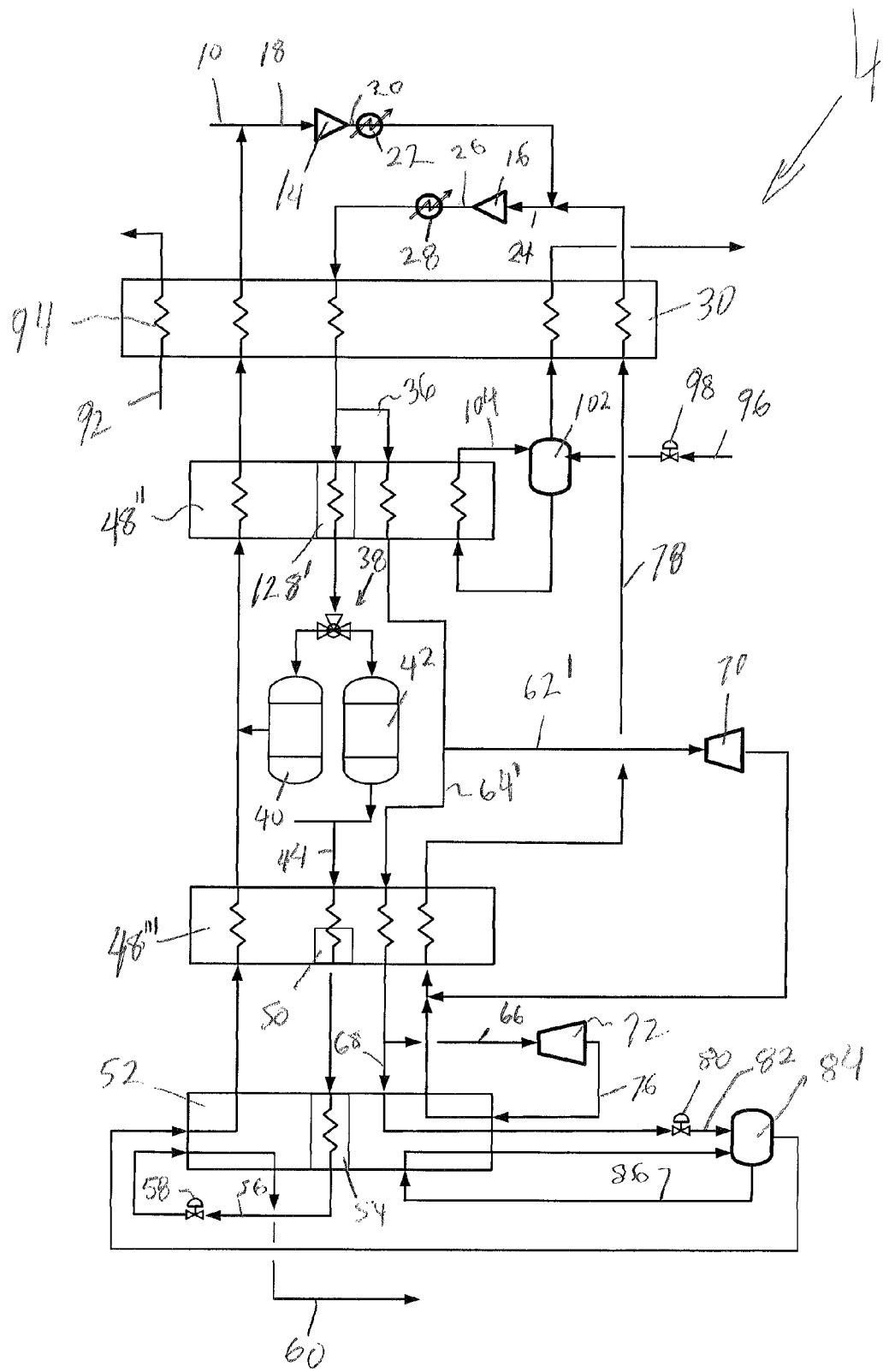
FIG. 5 is a schematic process flow diagram of an alternative embodiment of an apparatus for carrying out a method in accordance with the present invention.

With reference to FIG. 5, a liquefier 4 is illustrated that constitutes another alternative embodiment of liquefier 3. In liquefier 4, two intermediate temperature heat exchangers are utilized, namely, a warmer temperature intermediate heat exchanger 48'' and a colder temperature intermediate heat exchanger 48''' and the adsorption unit is positioned between such heat exchangers. The warmer temperature intermediate heat exchanger 48'' is provided with a higher temperature catalytic converter 128' serving the same function and having the same description as the higher temperature catalytic converter 128 discussed above in reference to liquefier 3. It additionally has passages dedicated to the introduction of the external liquid nitrogen refrigerant stream 96 and the closed loop circulation of the nitrogen liquid phase stream 104 as described above in connection with warmer temperature intermediate heat exchanger 48''. Furthermore, the colder temperature intermediate heat exchanger 48''' is provided with passages for the mechanical side of the refrigeration system, namely, turboexpanders 70 and 72 with the modification that second hydrogen containing stream 36 is cooled in the warmer temperature intermediate heat exchanger 48''', first and second subsidiary streams 62' and 64' are divided before the colder temperature intermediate heat exchanger 48''' and therefore, the subsidiary stream 62' is fed to first turboexpander 70 and the subsidiary stream 66 after having been fully cooled within the colder temperature intermediate heat exchanger is fed to the second turboexpander 72. The recycle stream 78 then is fed into the colder temperature intermediate heat exchanger 48''', bypasses the warmer temperature intermediate heat exchanger 48'' and is fed to the warm end heat exchanger 30. Liquefier 4 otherwise functions in the manner of liquefier 1 as described above. However, it has the advantage that the adsorption unit 38 operates at a lower temperature. This means that the selectivity of the adsorbent and the para-species content of the feed stream 38 could be higher. Further, some adsorbent materials show improved selectivity as temperature decreases.

Figure 6:
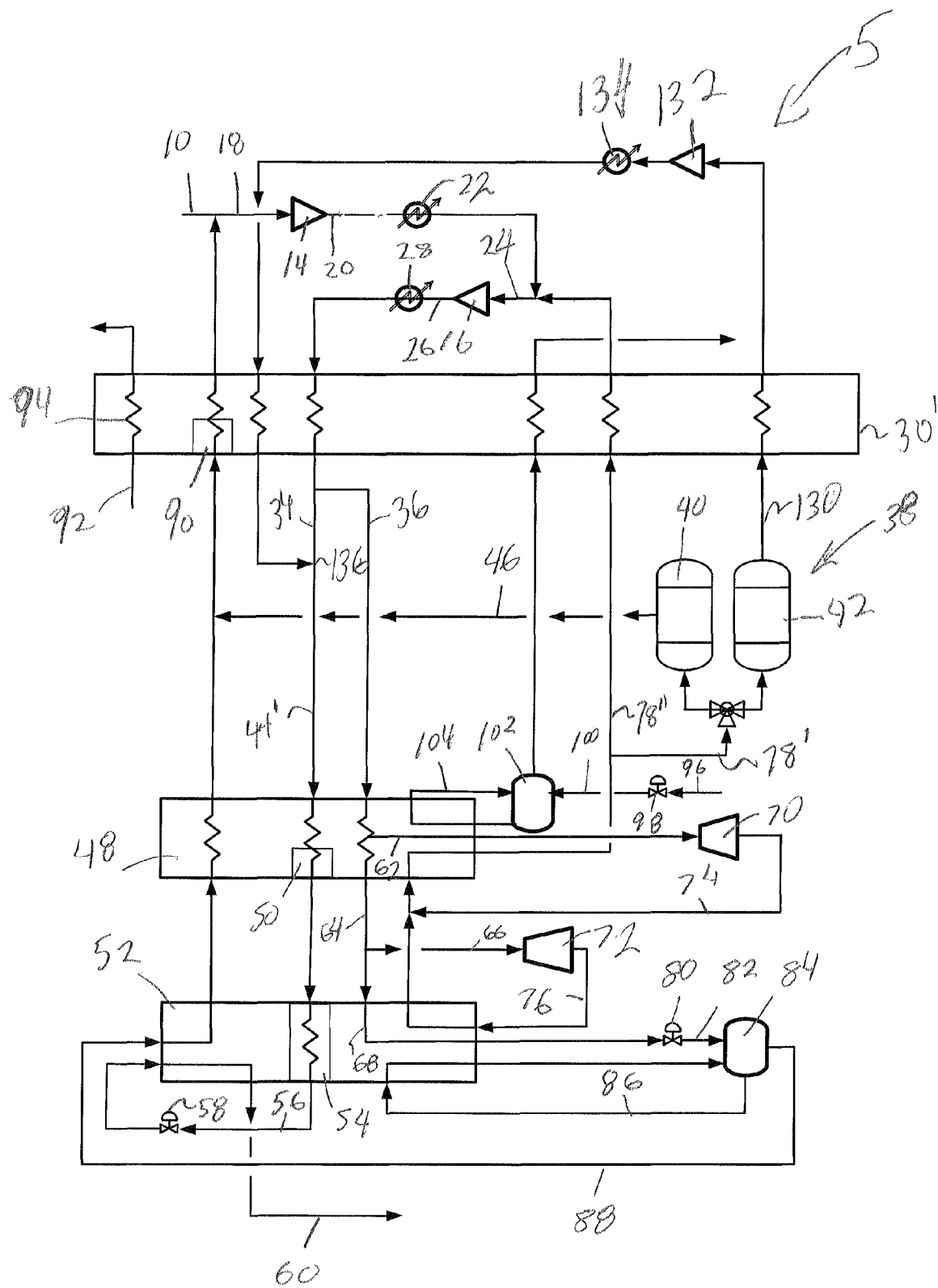
FIG. 6 is a schematic process flow diagram of an alternative embodiment of an apparatus for carrying out a method in accordance with the present invention.

With reference to FIG. 6, a liquefier 5 is illustrated that constitutes an alternative embodiment of liquefier 1. A major difference between liquefier 5 and liquefier 1 is that the process stream feed to the adsorption unit 38 is formed by a first part 78' of the recycle stream 78. The first part of the recycle stream 78' after passage through adsorption unit 38 is rich in the para-species and thereby constitutes a para-rich recycle stream 130. The para-rich recycle stream 130 being formed from an expanded stream is then compressed back to pressure within a recycle compressor 132 and after having been cooled in after-cooler 134 is cooled within warm end heat exchanger 30'. Thereafter, the para-rich recycle stream 130 is combined with the first hydrogen containing stream 34 at a piping junction 136 to form the para-rich stream 44' that is then subjected to catalytic conversion within catalytic converters 50 and 54 in the same manner as para-rich stream 44. The liquefier 5 otherwise functions in the same manner as liquefier 1. Liquefier 5 is an alternative process to the others shown. It has the disadvantage of a lower inlet pressure to the adsorption unit 92, which is likely to reduce separation efficiency. It also introduces additional streams to heat exchanger 30', making it more complex.

While the present invention has been described with reference to a preferred embodiment, as will occur to those skilled in the art, numerous additions, omissions and changes can be made without departing from the spirit and scope of the invention as set forth in the appended claims.

We claim:

1. A method of liquefying a hydrogen feed stream having both ortho-species and para-species of hydrogen, said method comprising:

liquefying the hydrogen contained within the hydrogen feed stream within a hydrogen liquefier to produce a liquid hydrogen product stream, the hydrogen liquefier having heat exchangers operating at successively lower temperatures to cool the hydrogen;

catalytically converting a portion of the ortho-species contained in the hydrogen feed stream to the para-species in a higher temperature catalytic converter, the portion being converted including desorbed ortho-species;

adsorbing a further portion of the ortho-species contained in the hydrogen feed stream within an adsorbent of at least one adsorption unit to produce a para-rich stream containing unadsorbed ortho-species and regenerating the adsorbent within the at least one adsorption unit through desorption to produce the desorbed ortho-species;

introducing the desorbed ortho-species into the higher temperature catalytic converter;

introducing at least the para-rich stream into a lower temperature catalytic converter and catalytically converting at least the unadsorbed ortho-species to the para-species, thereby producing an ortho lean stream having a reduced content of the ortho-species as compared with that of the hydrogen feed stream; and forming the liquid hydrogen product stream from the ortho lean stream;

the higher temperature catalytic converter, the at least one lower temperature catalytic converter and the at least one adsorption unit being in flow communication with the heat exchangers such that the higher temperature catalytic converter operates at a higher temperature level greater than that of the at least one lower temperature catalytic converter and the at least one adsorption unit has an operational temperature no greater than that of the higher temperature catalytic converter and greater than that of the lower temperature catalytic converter.

2. The method of claim 1, wherein:

the hydrogen feed stream is compressed, combined with at least part of a recycle stream to form a combined hydrogen stream and the combined hydrogen stream is compressed within the hydrogen liquefier;

the heat exchangers include a warm end heat exchanger situated at a warm end of the liquefier and a cold end heat exchanger having the cold end temperature and situated at a cold end of the liquefier, the ortho-lean stream being discharged from the cold end of the cold end heat exchanger;

the combined hydrogen stream is cooled within the warm end heat exchanger;

refrigeration is imparted to the heat exchangers so that the heat exchangers operate at the successively lower temperatures;

part of the refrigeration within the liquefier is imparted to the heat exchangers by cooling a portion of the combined hydrogen stream, dividing the combined hydrogen stream into subsidiary streams that are expanded with the performance of work in at least two turboexpanders operating at least two of the successively lower temperatures to produce exhaust streams, introducing the two exhaust streams into at least the cold end heat exchanger and an intermediate temperature heat exchanger situated between the warm end heat exchanger and the cold end heat exchanger, combining the exhaust streams to produce the recycle stream; and another part of the refrigeration within the liquefier is imparted by two external refrigerant streams that are respectively introduced into the warm end heat exchanger and one of the heat exchangers positioned between the warm end heat exchanger and the cold end heat exchanger.

3. The method of claim 2, wherein:

the combined hydrogen stream is divided into a first hydrogen containing stream and a second hydrogen containing stream;

the first hydrogen containing stream is subjected to the adsorption to form the para-rich stream and the portion of the combined hydrogen stream is formed from the second hydrogen containing stream;

further refrigeration is imparted into the liquefier by partly cooling a portion of the second hydrogen containing stream within the cold end heat exchanger, expanding the portion of the second hydrogen containing stream into a two-phase stream, separating the two-phase stream within a phase separator into a vapor phase and a liquid phase, circulating a liquid phase stream composed of the liquid phase to the cold end heat exchanger and back to the phase separator, introducing a vapor phase stream composed of the vapor phase into the cold heat exchanger, warming the vapor phase stream within the heat exchangers and discharging the vapor phase stream from the warm end heat exchanger;

the vapor phase stream is combined with the hydrogen feed stream and compressed along with the hydrogen feed stream and combined with all of the recycle stream along with the hydrogen feed stream after the compression thereof;

the desorbed ortho-species are contained in a waste stream that is combined with the vapor phase stream to recirculate the desorbed ortho-species; and the para-rich stream is introduced into the at least one lower temperature catalytic converter to form an ortho-lean stream having the reduced ortho-species content.

4. The method of claim 3, wherein:

the para-rich stream is introduced into the intermediate temperature heat exchanger;

the at least one lower temperature catalytic converter is a first lower temperature catalytic converter and a second lower temperature catalytic converter; and the para-rich stream is introduced into the first lower temperature catalytic converter and thereafter, the second lower temperature catalytic converter, the first lower temperature catalytic converter and the second lower temperature catalytic converter being located within the intermediate temperature heat exchanger and the cold end heat exchanger, respectively.

5. The method of claim 2, wherein:

the first hydrogen containing stream passes through the intermediate temperature heat exchanger;

the para-rich stream is introduced into the cold end heat exchanger;

the para-rich stream is introduced into a lower temperature catalytic converter that constitutes the at least one lower temperature catalytic converter, the lower temperature catalytic converter being located within the cold end heat exchanger; and the first hydrogen containing stream is introduced into the higher temperature catalytic converter, the higher temperature catalytic converter being located within the intermediate temperature heat exchanger.

6. The method of claim 4, wherein:

the intermediate temperature heat exchanger is a lower temperature intermediate heat exchanger;

the heat exchangers include a higher temperature intermediate heat exchanger situated between the warm end heat exchanger and the lower temperature intermediate heat exchanger;

the first hydrogen containing stream and the second hydrogen containing stream cool within the higher temperature intermediate heat exchanger;

the para-rich stream is introduced into the lower temperature intermediate temperature heat exchanger; and the first hydrogen containing stream is introduced into the higher temperature catalytic converter, the higher temperature catalytic converter located within the warmer intermediate temperature heat exchanger.

7. The method of claim 4 wherein:

the part of the ortho-species content of a hydrogen containing process stream is adsorbed in an adsorbent bed unit having at least two adsorbent beds operating in an out-of-phase cycle so that while one of the adsorbent beds is adsorbing the ortho-species content another of the adsorbent beds is desorbing the ortho-species content to form a waste stream containing the desorbed ortho-species;

the waste stream is discharged into the vapor phase stream; and the vapor phase stream, after the waste stream is discharged into the vapor phase stream, is introduced into the higher temperature catalytic converter; the higher temperature catalytic converter being located within the warm end heat exchanger.

8. The method of claim 4, wherein:

the part of the ortho-species content of a hydrogen containing process stream is adsorbed in an adsorbent bed unit having at least two adsorbent beds operating in an out-of-phase cycle so that while one of the adsorbent beds is adsorbing the ortho-species content another of the adsorbent beds is desorbing the ortho-species content to form a waste stream containing the desorbed ortho-species;

the waste stream is discharged into the recycle stream; and the recycle stream is passed through the higher temperature catalytic converter, the higher temperature catalytic converter being located within the warm end heat exchanger.

9. The method of claim 2, wherein:

the combined hydrogen stream is divided into a first hydrogen containing stream and a second hydrogen containing stream;

the portion of the combined hydrogen stream is formed from the second hydrogen containing stream;

further refrigeration is imparted into the liquefier by partly cooling a portion of the second hydrogen containing stream within the cold end heat exchanger, expanding the portion of the second hydrogen containing stream into a two-phase stream, separating the two-phase stream within a phase separator into a vapor phase and a liquid phase, circulating a liquid phase stream composed of the liquid phase to the cold end heat exchanger and back to the phase separator, introducing a vapor phase stream composed of the vapor phase into the cold end heat exchanger, warming the vapor phase stream within the heat exchangers and discharging the vapor phase stream from the warm end heat exchanger;

the vapor phase stream is combined with the hydrogen feed stream and compressed along with the hydrogen feed stream and combined with a first part of the recycle stream along with the hydrogen feed stream after the compression thereof, thereby to form the combined stream; and the para-rich stream is a para-rich recycle stream formed by adsorbing the part of the ortho-species content of the second part of the recycle stream to produce the para-rich recycle stream;

the para-rich recycle stream is warmed in the warm end heat exchanger, compressed, cooled in the warm end heat exchanger and combined with the first hydrogen containing stream to form a combined para-rich stream; and the combined para-rich stream is introduced into the at least one lower temperature catalytic converter.

10. The method of claim 9, wherein:

the para-rich recycle stream is introduced into the intermediate temperature heat exchanger; and the at least one lower temperature catalytic converter is a first lower temperature catalytic converter and a second lower temperature catalytic converter; and the combined para-rich stream is introduced into the first lower temperature catalytic converter and thereafter, the second lower temperature catalytic converter, the first lower temperature catalytic converter and the second lower temperature catalytic converter being located within the intermediate temperature heat exchanger and the cold end heat exchanger, respectively.

11. The method of claim 10, wherein the part of the ortho-species content of a hydrogen containing process stream is adsorbed in an adsorbent bed unit having at least two adsorbent beds operating in an out-of-phase cycle so that while one of the adsorbent beds is adsorbing the ortho-species content another of the adsorbent beds is desorbing the ortho-species content to form a waste stream containing the desorbed ortho-species;

the waste stream is discharged into the vapor phase stream; and after discharge of the waste stream into the vapor phase stream, the vapor phase stream is introduced into the higher temperature catalytic converter, the higher temperature catalytic converter being located within the warm end heat exchanger.

12. The method of claim 7 or claim 8, wherein the one of the heat exchangers positioned between the warm end heat exchanger and the cold end heat exchanger is the intermediate temperature heat exchanger.

13. The method of claim 9, wherein the one of the heat exchangers positioned between the warm end heat exchanger and the cold end heat exchanger is the warmer temperature intermediate heat exchanger.

14. The method of claim 12, wherein the liquid hydrogen product stream is formed by discharging the ortho-lean stream from the cold end heat exchanger, expanding the ortho-lean stream, cooling the ortho-lean stream after having been expanded within the cold end heat exchanger and discharging the ortho-lean stream from the cold end heat exchanger as the liquid hydrogen product stream.

15. The method of claim 13, wherein the liquid hydrogen product stream is formed by discharging the ortho-lean stream from the cold end heat exchanger, expanding the ortho-lean stream, cooling the ortho-lean stream after having been expanded within the cold end heat exchanger and discharging the ortho-lean stream from the cold end heat exchanger as the liquid hydrogen product stream.

* * * * *